US008527446B2

(12) United States Patent
Byrne et al.

(10) Patent No.: US 8,527,446 B2
(45) Date of Patent: Sep. 3, 2013

(54) INFORMATION INTEGRITY RULES FRAMEWORK

(75) Inventors: Brian Patrick Byrne, Austin, TX (US); Guenter Anton Sauter, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 12/614,525

(22) Filed: Nov. 9, 2009

(65) Prior Publication Data
US 2011/0113001 A1    May 12, 2011

(51) Int. Cl.
G06N 5/02    (2006.01)
(52) U.S. Cl.
CPC ................................ *G06N 5/025* (2013.01)
USPC .......................................................... 706/50
(58) Field of Classification Search
None
See application file for complete search history.

(56) References Cited

U.S. PATENT DOCUMENTS

| | | | |
|---|---|---|---|
| 7,020,869 B2 | 3/2006 | Abrari et al. | 717/108 |
| 7,065,745 B2 | 6/2006 | Chan | 717/117 |
| 7,318,162 B2 | 1/2008 | Rineer et al. | 713/193 |
| 7,412,451 B2 * | 8/2008 | McCrady et al. | 1/1 |
| 7,660,780 B1 * | 2/2010 | Patoskie | 706/62 |
| 7,698,243 B1 * | 4/2010 | Hauser | 706/45 |
| 8,200,603 B1 * | 6/2012 | Patoskie | 706/47 |
| 2003/0233376 A1 | 12/2003 | Bussler et al. | 707/104.1 |
| 2003/0236690 A1 | 12/2003 | Johnston-Watt et al. | 705/7 |
| 2007/0050364 A1 | 3/2007 | Cummins | 707/9 |
| 2007/0094199 A1 | 4/2007 | Deshpande et al. | 706/47 |
| 2008/0140602 A1 | 6/2008 | Roth et al. | 706/59 |
| 2009/0006283 A1 | 1/2009 | Labrie et al. | 706/12 |
| 2009/0138258 A1 | 5/2009 | Neale | 704/9 |

OTHER PUBLICATIONS

Povey, Dean et al.; "Optimistic Security: A New Access Control Paradigm"; 2000; ACM; pp. 40-45.*
Fayyad, Usama et al.; "From Data Mining to Knowledge Discovery in Databases"; 1996; American Association for Artificial Intelligence; pp. 37-54.*
Nelson, Matthew L. et al.; "A Lifecycle Approach towards Business Rules Management"; IEEE; Proceedings of the 41st Hawaii International Conference on System Sciences; pp. 1-10.*
"Semantics of Business Vocabulary and Business Rules (SBVR)," v1.0, Object Management Group, Jan. 2008.
Bernstein, et al., "An Overview of Repository Technology" Proceedings of the 20th International Conference on Very Large Data Bases, pp. 705-713, Year of Publication: 1994.
Loshin, "Data Profiling, Data Integration and Data Quality" Business Intelligence Network™, Powell Media, LLC and David Loshin, May 2007.

(Continued)

*Primary Examiner* — Jeffrey A Gaffin
*Assistant Examiner* — Stanley K Hill
(74) *Attorney, Agent, or Firm* — VanLeeuwen & VanLeeuwen; Elissa Y. Wang

(57) ABSTRACT

An information integrity rules framework manages rules across heterogeneous enforcement systems by managing canonical rules that are mapped to native rules and enforcement system-specific rules. The information integrity rules framework discovers an existing native rule utilized by an enforcement system, which is written in an enforcement system-specific format. Next, the information integrity rules framework creates a mapping entry and maps the native rule to a canonical rule, which is independent from the enforcement system. When the information integrity rules framework detects a change to one of the rules managed by the framework, the information integrity rules framework propagates the change to other corresponding rules across enforcement systems managed by the framework.

15 Claims, 11 Drawing Sheets

(56) References Cited

OTHER PUBLICATIONS

International Search Report and Written Opinion for PCT Application No. PCT/EP2010/067017, mailed Feb. 15, 2011, 10 pages.
Rosenberg et al., "Design and Implementation of a Service-Oriented Business Rules Broker," Proceedings of the 2005 Seventh IEEE International Conferfence on E-Commerce Technology Workshops (CECW'05), Jul. 2005, 9 pages.
Yatsenko, "Enhancing Integrity by Integrating Business Rules, Triggers, and Active Database Techniques," IACIS 2002 International Association for Computer Information Systems, Issues in Information Systems, vol. III, Dec. 2002, 7 pages.
Oracle, "Application Developer's Guide—Fundamentals," 10g Release 1 (10.1), Dec. 2003, 582 pages.

\* cited by examiner

INFORMATION INTEGRITY RULES FRAMEWORK

TECHNICAL FIELD

The present disclosure relates to an information integrity rules framework. More particularly, the present disclosure relates to a framework that maps native rules to canonical rules and enforcement system-specific rules in order to effectively manage rule changes across heterogeneous enforcement systems.

BACKGROUND

A business typically has many database storage areas for storing company data. These database storage areas may be managed by various types of enforcement systems that ensure data accuracy. Enforcement systems are typically "optimistic" enforcement system types or "pessimistic" enforcement system types. An optimistic enforcement system is often enacted through data profiling and checks data when it is retrieved from a storage area. Optimistic enforcement systems assume that rule violations are either rare or tolerable (at least for some time period). These systems apply a data profiling tool at intervals that are also based on a set of information integrity rules. The profiling tool identifies violations and allows a user to take corrective actions. Pessimistic enforcement systems enforce rules before new/modified data is persisted in a data store. Pessimistic enforcement systems assume that integrity constraints may be violated and, therefore, enforce rules before the changes are persisted into storage.

Each of these enforcement systems may have a set of rules that govern how they control the integrity of the data. Over time, one set of rules may become disjointed with another set of rules and, in turn, one enforcement system may treat data differently than another enforcement system.

SUMMARY

An information integrity rules framework manages rules across heterogeneous enforcement systems using mapping entries that map native rules to canonical rules.

According to one embodiment, a computer program product is disclosed that, when executed, performs actions for managing rules. The computer program product discovers an existing native rule utilized by an enforcement system, which is written in an enforcement system-specific format. Next, the computer program product creates a mapping entry and maps the native rule to a canonical rule, which is written in a canonical format. The computer program product then manages the rules using the mapping entry.

According to another embodiment, an information handling system is disclosed that includes a processor, memory, a nonvolatile storage area, and a set of instructions that, when executed, perform actions for managing rules. The information handling system discovers an existing native rule utilized by an enforcement system, which is written in an enforcement system-specific format. Next, the information handling system creates a mapping entry and maps the native rule to a canonical rule, which is written in a canonical format. The information handling system then manages the rules using the mapping entry.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features, and advantages made apparent to those skilled in the art by referencing the accompanying drawings, wherein.

DETAILED DESCRIPTION

Figure 1:
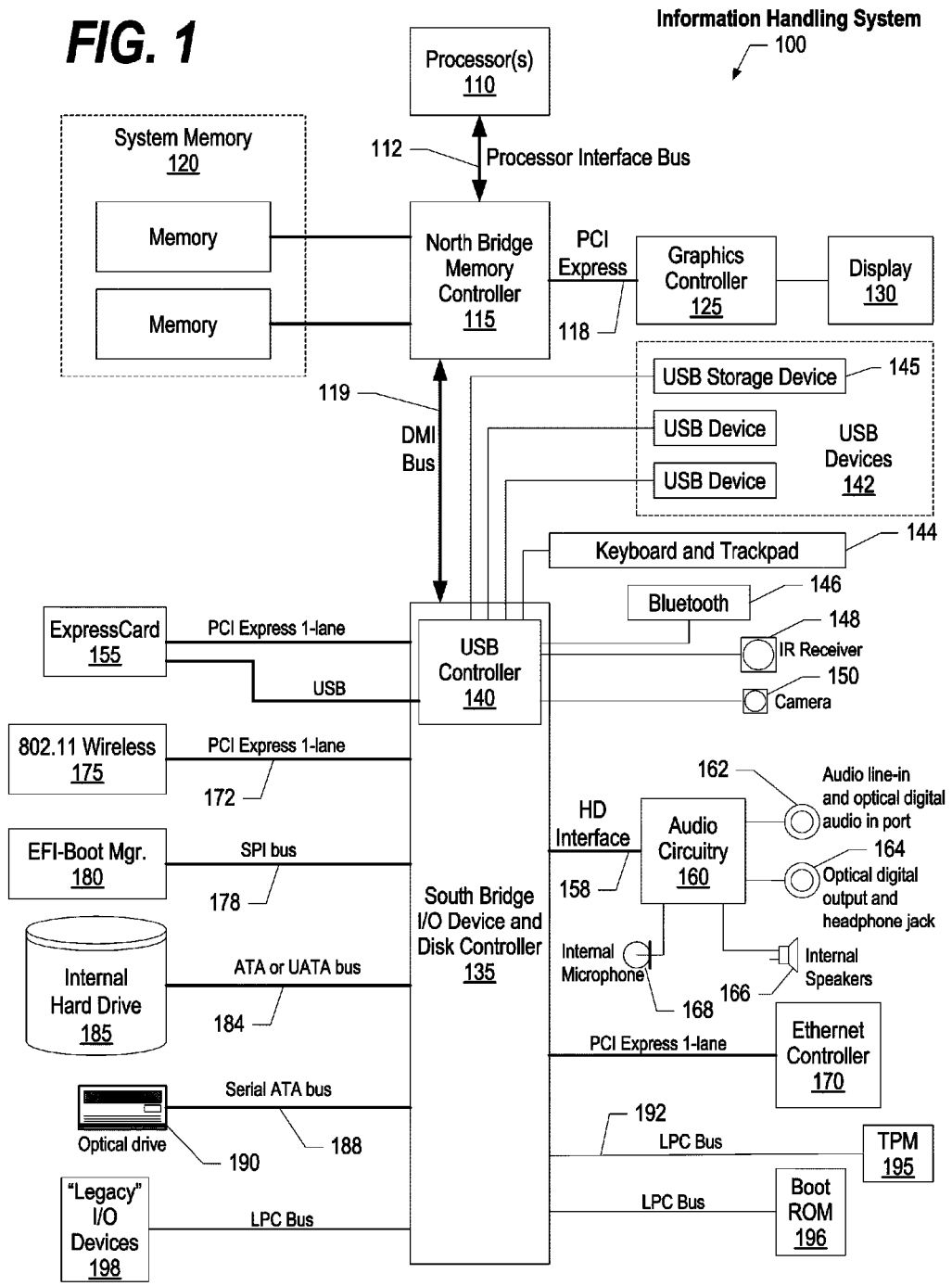
FIG. 1 is a block diagram of a data processing system in which the methods described herein can be implemented.

Certain specific details are set forth in the following description and figures to provide a thorough understanding of various embodiments of the disclosure. Certain well-known details often associated with computing and software technology are not set forth in the following disclosure, however, to avoid unnecessarily obscuring the various embodiments of the disclosure. Further, those of ordinary skill in the relevant art will understand that they can practice other embodiments of the disclosure without one or more of the details described below. Finally, while various methods are described with reference to steps and sequences in the following disclosure, the description as such is for providing a clear implementation of embodiments of the disclosure, and the steps and sequences of steps should not be taken as required to practice this disclosure. Instead, the following is intended to provide a detailed description of an example of the disclosure and should not be taken to be limiting of the disclosure itself. Rather, any number of variations may fall within the scope of the disclosure, which is defined by the claims that follow the description.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
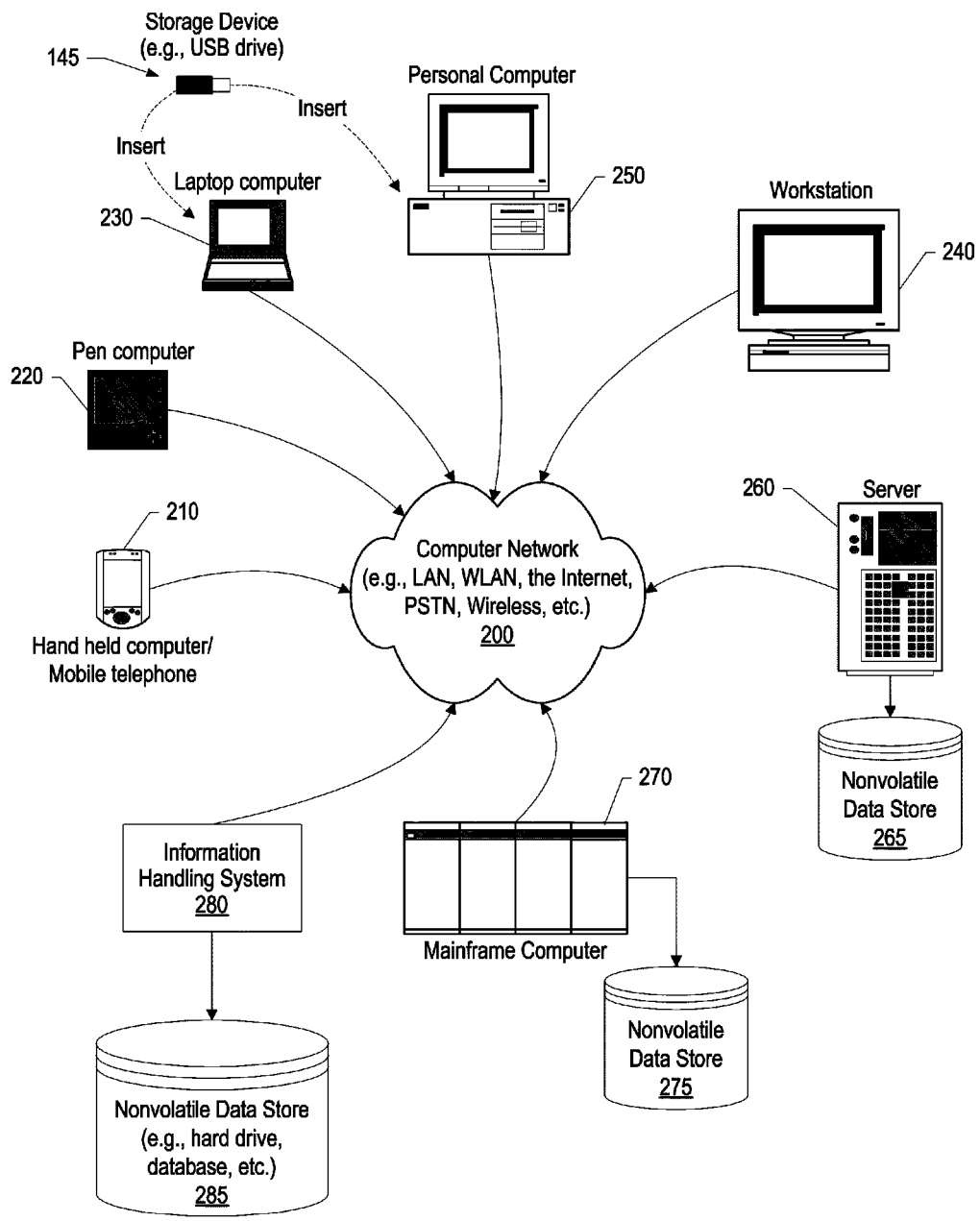
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security sub-system that may be incorporated into any number of information handling systems, such as those outlined in FIG. 2.

FIG. 2 provides an extension example of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
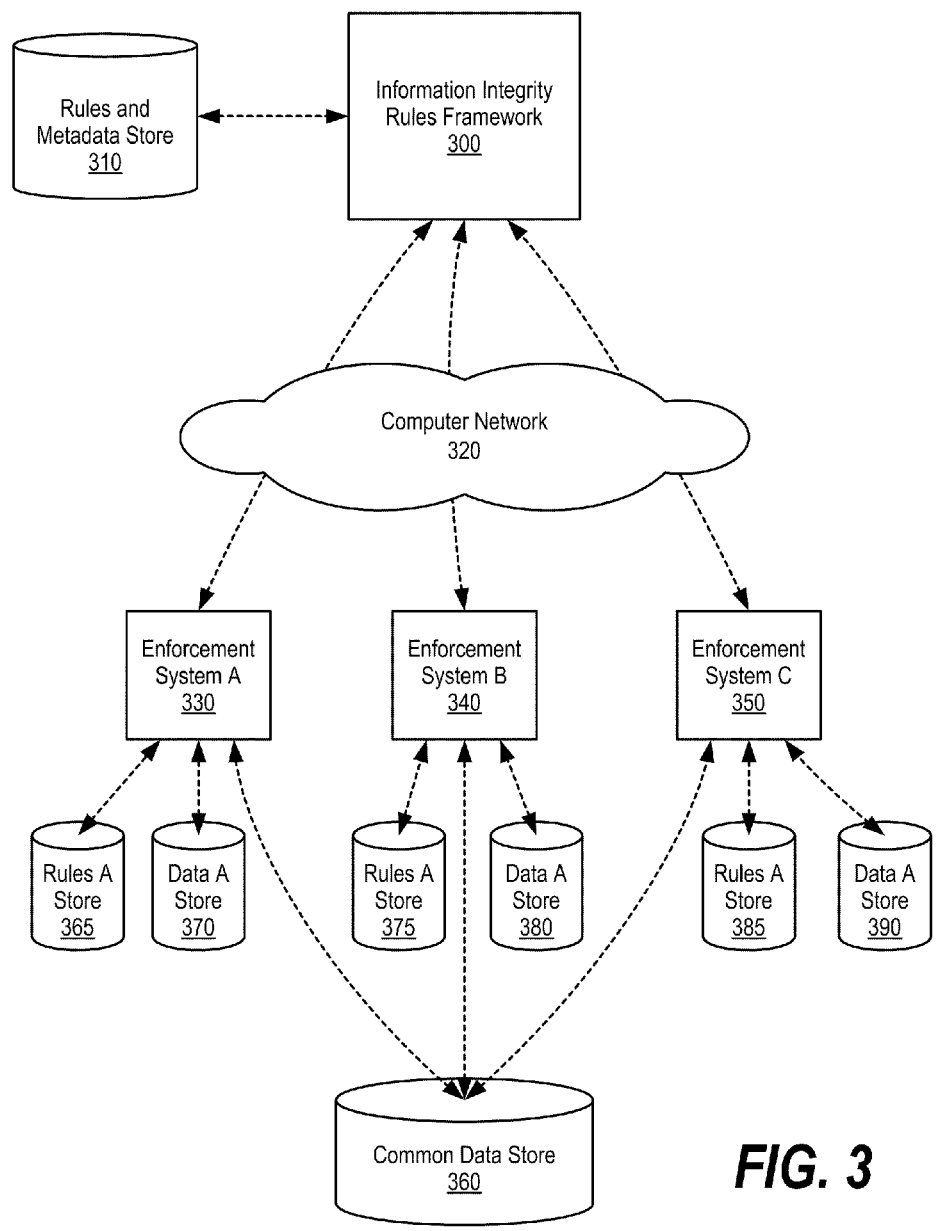
FIG. 3 is a high level diagram showing an information integrity rules framework (IIRF) managing rules across multiple heterogeneous enforcement systems.

FIG. 3 is a high level diagram showing an information integrity rules framework (IIRF) managing rules across multiple heterogeneous enforcement systems. IIRF 300 creates and utilizes canonical rules for managing rule commonalities and rule mappings across enforcement systems 330-350. A canonical rule is a logical expression of a rule, expressed through the use of business terms and other structures to completely define a constraint or other rule associated with the business term. A business term is a formal and unique definition of a business concept that is of interest to an evaluated topic (e.g., product cost). Business terms are typically expressed as part of a formal model for standardizing terminology of a business glossary model. Business terms are typically uniquely named, identified and defined within such a model. As such, IIRF 300 specifies canonical rules independently from a runtime environment that enforces the rules (e.g. rules engine, data profiling engine, API implementation, etc.

IIRF 300 discovers native rules for enforcement systems 330-350 through computer network 320, and creates canonical rules, which IIRF 300 stores in rules and metadata store 310. IIRF 300 identifies explicitly stated rules (stored in rules store 365, 375, and 385) as well as implicit rules that are inferred from data patterns (located in data stores 370, 380, and 390), which allows IIRF 300 to derive a full understanding of existing rules in order to generate corresponding canonical rules associated with a set of business concepts. In one embodiment, enforcement systems 330-350 each enforce their specific native rules on common data that is stored in common database store 360. Rules and metadata store 310, rules store 375, 385, data stores 360, 370, 380, and 390 may be stored on a nonvolatile storage area, such as a computer hard drive).

IIRF 300 generates canonical rules in order to decouple a rule specification from its enforcement approach, which provides greater flexibility at lower costs when selecting the best enforcement option for a system. Canonical rules are specified once, and an enforcement system-specific rule may be generated from the canonical rule at the time a particular enforcement system is selected.

Enforcement systems 330-350 may be a combination of optimistic enforcement system types and pessimistic enforcement system types. An optimistic enforcement system is often enacted through data profiling and checks data when the data is retrieved from a storage area. Optimistic enforcement system types assume that rule violations are either rare or they are tolerable (at least for some time period). In turn, a data profiling tool may then be applied over some frequency that is also based on a set of rules Pessimistic enforcement system types enforce the rules on data before the new/modified data is persisted in a data store. Pessimistic enforcement systems assume that integrity constraints may be violated and, therefore, rules are enforced before the changes are persisted.

Once IIRF 300 creates canonical rules, IIRF 300 generates enforcement system-specific rules and deploys the rules to particular enforcement systems. IIRF 300 controls which rules are enforced by which enforcement system, with which approach (i.e. pessimistic/optimistic). As a result, rules in the various enforcement systems are not completely rewritten, but are generated from canonical rules, which improve the development time. IIRF 300 may use the same canonical integrity rule set to enforce the same rule in multiple places (e.g. when you have data redundancy in heterogeneous databases), thus increasing the consistency of the deployed rules.

Figure 11:
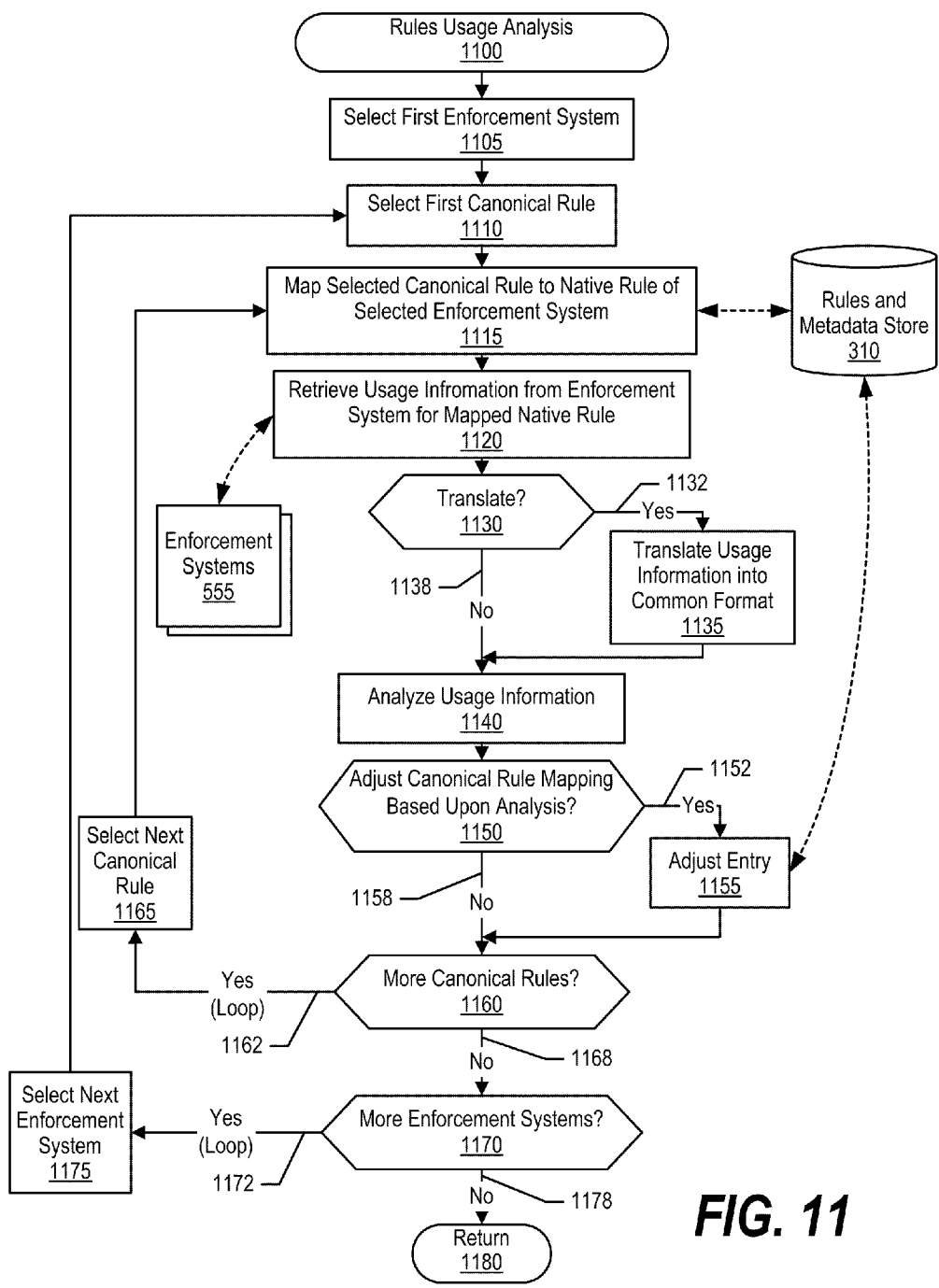
FIG. 11 is a flowchart showing steps taken in analyzing rules usage across enforcement systems.

Once deployed, IIRF 300 tracks rule usage across enforcement systems 330-350, which allows audit and reporting of distribution and usage of business rules (see FIG. 11 and corresponding text for further details). Administrators may then determine which rules should be managed on various levels of visibility (project, system, business, etc.).

In one embodiment, IIRF 300 stores and manages canonical rules across multiple projects. IIRF 300 uses a common (metadata) repository (rules and metadata store 310) for providing controlled and secured access to the canonical rules and corresponding mappings to native and enforcement system-specific rules. This repository keeps track of which canonical rules are enforced at what enforcement systems. In turn, authorized users are able to manage relevant information integrity rules without being limited by project, system, or organizational boundaries. As a result, a user achieves improved understanding of existing requirements and their enforcement locations. This also improves the reusability of information integrity rules and the consistency of rule definition and enforcement, ultimately leading to significantly higher data quality at lower costs.

In another embodiment, IIRF 300 supports rule versioning on a canonical level as well as an enforcement system-specific level and the annotation of the versions. This allows users to track rule changes and for what reason. IIRF 300 also provides the user the flexibility to choose how to propagate the changes on the canonical level down to specific enforcement systems. Some changes in canonical rules may have to be propagated immediately, others with a delay, and in some other cases not propagated at all. The user may also change the enforcement approach when canonical rules are modified. For example, if a customer must have only one legal address, IIRF 300's user may choose to enforce this new rule in multiple ways. A pessimistic enforcement would guarantee that newly established customer information is only persisted if this rule passes. An optimistic enforcement will allow persistence of customer data, and later identify customers that do not meet this criterion.

Figure 4:
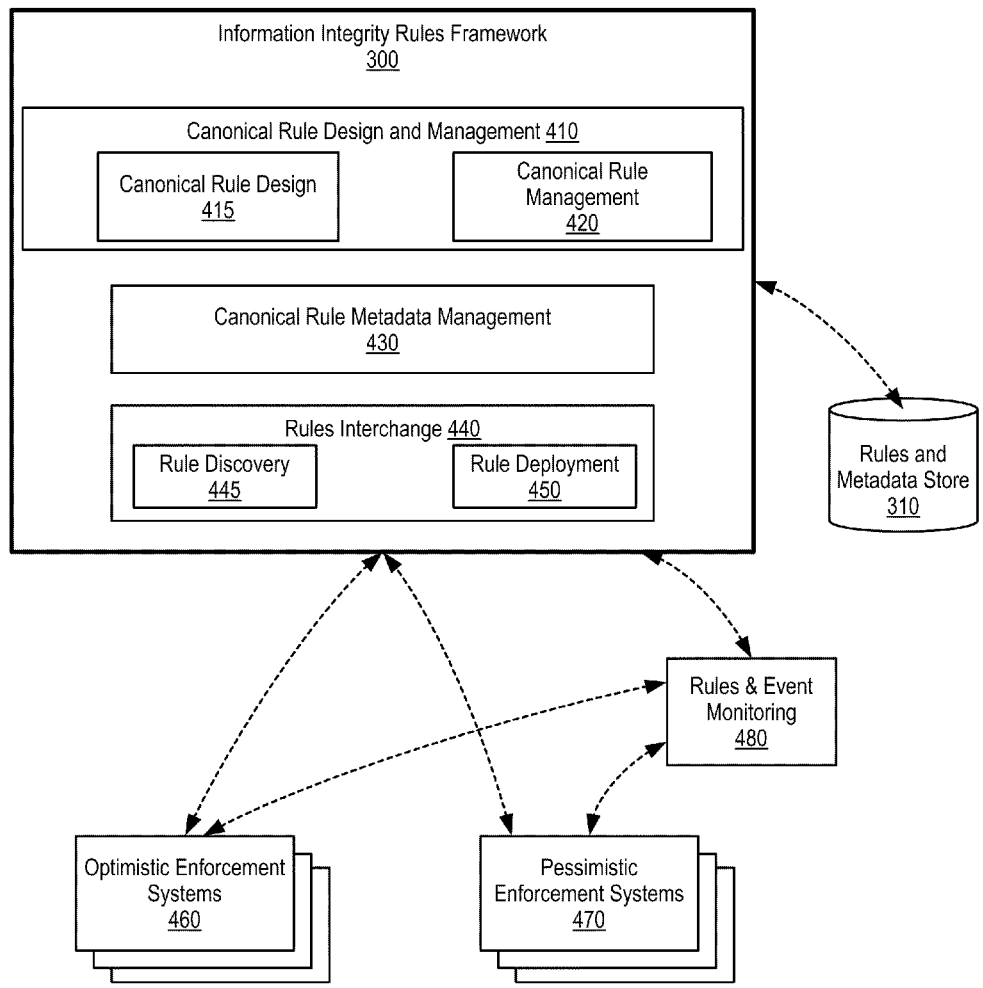
FIG. 4 is a diagram showing major components included in an information integrity rules framework.

FIG. 4 is a diagram showing major components included in an information integrity rules framework. Information integrity rules framework 300 includes canonical rule design and management component 410, canonical rule metadata management 430, and rules interchange 440. Each of components 410-440 play an integral part of discovering native rules, creating canonical rules from the native rules, and generating enforcement system-specific rules from the canonical rules, which are subsequently deployed and tracked at enforcement systems.

Canonical rule design and management component 410 supports a user in designing canonical rules, the relationships between these rules, and the association of rules with other assets, such as agreed business terms as part of a glossary, through a rule design capability. Canonical rule design and management component 410 also supports tracking rule distribution and deployment, selection of rule enforcement approach, and rule usage reporting through a rule management and tracking capability. Canonical rule design and management component 410 includes two sub-components, which are canonical rule design 415 and canonical rule management 420.

Canonical rule design 415 supports information integrity rules specifications in a canonical format, which is independent of how the rules are enforced and executed at any particular enforcement system. These rule specifications are expressed in terms of business concepts that they constrain, and may also be related to other logical model artifacts.

Canonical rule management 420 assists a user in selecting a particular runtime/enforcement system for a particular (set of) rule(s), managing rule deployment/discovery, and tracking and reporting rule usage. Canonical rule management 420 keeps track of which rule is enforced by which enforcement system(s), the manner in which these rules are enforced, and additional operation metadata such as when or how frequently the rule is enforced.

Canonical rule metadata management component 430 stores and manages metadata related to information integrity rules in rules and metadata store 310. Once canonical rules are specified, they are stored in rules and metadata store 310 within a metadata management component, and related to deployed or discovered native rules. Rules and metadata store 310 stores the information integrity rules and keeps operational metadata such as frequency of rule validation, rule failures etc. Canonical rule metadata management component 430 may store the information integrity rules in the canonical format as well as in the native format of a particular enforcement system. Rules and metadata store 310 also maintains the linkage between the canonical rules and the native rules and any other dependencies or relationships. A corresponding metadata management component manages the repository and provides functions such as search, retrieval, check in/check out etc.

Rule interchange component 440 facilitates enforcement system-specific rule deployment to specific enforcement systems, as well as existing rules discovery. Rule discovery component 445 identifies existing native rules within enforcement systems having various technical platforms (optimistic enforcement systems 460 and pessimistic enforcement systems 470) and harvests these into the design tools and the common metadata repository for review. The native rules may then be programmatically or manually mapped to existing canonical rules, or generate new canonical rules (see FIG. 8 and corresponding text for further details).

Enforcement system-specific rules are generated from canonical rules, which are then deployed via rule deployment 450 to various enforcement systems using an optimistic enforcement approach and/or a pessimistic approach. Some of these runtime components, in particular the databases and some of the applications, may implicitly include information integrity rules without a formal specification. When deploying an enforcement system-specific rule to a particular enforcement system, IIRF 300 generates an information integrity rule artifact in the native format of the selected enforcement system. In one embodiment, for simple rule specifications, this artifact may be a complete native rule specification that may be directly executed. In another embodiment, it might be impractical to automatically transform complex rule specifications into a correct and complete native format. In this embodiment, IIRF 300 may generate a requirement specification and fragments of the rule in the native format which can then be further refined in the enforcement system.

IIRF 300 may leverage rules & event monitoring component 480 to monitor rules usage by enforcement systems 460 and 470. IIRF 300 may then link canonical rules to the monitored events and modify the canonical rules accordingly (see FIG. 11 and corresponding text for further details).

Figure 5:
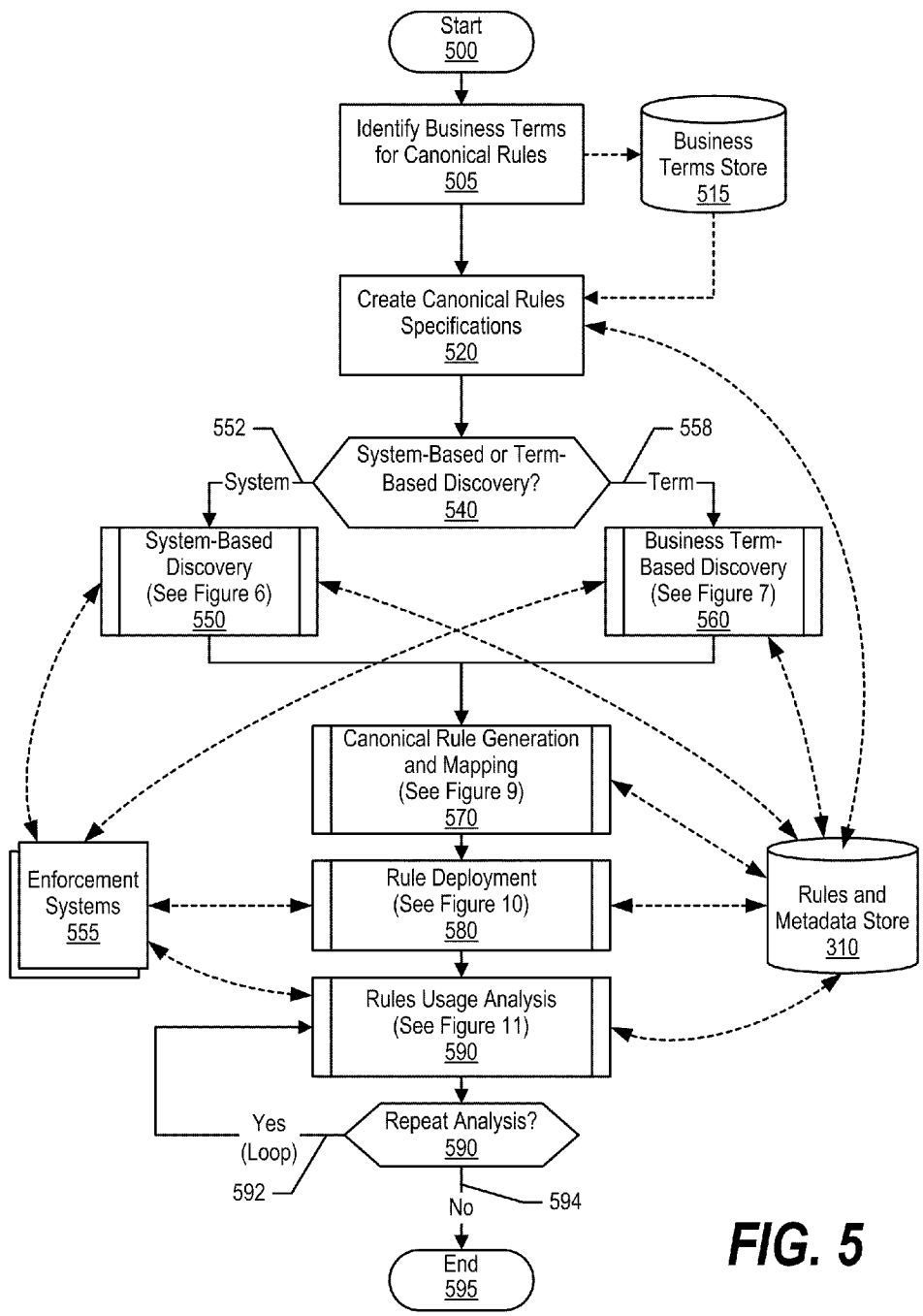
FIG. 5 is a high-level flowchart showing steps taken in mapping canonical rules with native rules and deploying enforcement-system specific rules generated from the canonical rules.

FIG. 5 is a high-level flowchart showing steps taken in mapping canonical rules with native rules and deploying enforcement-system specific rules generated from the canonical rules. IIRF 300 expresses canonical rules in a way that is not biased by a particular enforcement system-specific format (implementation style) or limited to a particular enforcement-system technology. This implementation-neutral, or canonical representation, allows IIRF 300 to make decisions and observations about rules in a way that is independent of the constraints of any one platform or environment.

Processing commences at 500, whereupon IIRF 300 identifies business terms in for use in specifying rules, which are stored in business terms store 515. When setting up a project, administrators may specify a relationship between a rule set and a physical data set for which the rules are meant to enforce. Next, IIRF 300 creates canonical rules specifications from the business terms (step 520) and stores the canonical rules specifications (e.g., canonical rules) in rules and metadata store 310.

Canonical rules typically include business terms, instances, and actions. Business terms are typically recognized business concepts as expressed through an agreed business glossary, such as "product cost", "customer age," etc. Instances are specific cases of business terms that have been defined a known value. For example, the business term "product cost" may have an instance of "169 USD". Instances may also be entire business concepts such as "Bank X's Premium Deposit Product". One differentiation between a business term and an instance is that a business term acts like a variable, while an instance is a distinct value of that variable. Actions commonly link terms and instances. For example, a rule such as "An applicant's age must be over 18" includes a business term (applicant's age) being linked to an instance (over 18) by the action "must be".

By breaking up a canonical rule in this manner, the canonical rule may be factored and mapped to known canonical expressions such as agreed business terms, instances and actions. For example, after identifying the business terms that are encoded into a enforcement system-specific format, these enforcement system-specific terms can then be matched to an agreed set of business terms (canonical business terms), combined with a similar instances and actions, to produce a canonical (platform independent) representation of that same rule.

In one embodiment, native rules may be hidden in application code at an enforcement system, or only known to the enforcement system's end users. For example, an end user may know that he must enter the address of a person when creating a customer record. Discovering these hidden rules significantly accelerates the modeling of canonical information integrity rules and improves their completeness and correctness, especially in situations where an organization has a significant amount of data with implicitly defined information integrity rules.

A determination is made as to whether the administrator wishes to perform a system-based discovery or business term-based discovery for native rules located on enforcement systems 555 (decision 540). Both set of discovery approaches result in a set of selected systems and business terms during native rule discovery. When defining the scope of discovery, users may select enforcement systems (system-based discover) and, in turn, IIRF 300 retrieves related business terms. Or, a user may select business terms (business term-based discovery) and, in turn, IIRF 300 retrieves related enforcement systems. In either case, IIRF 300 stores the discovered rules in rules and metadata store 310.

Figure 6:
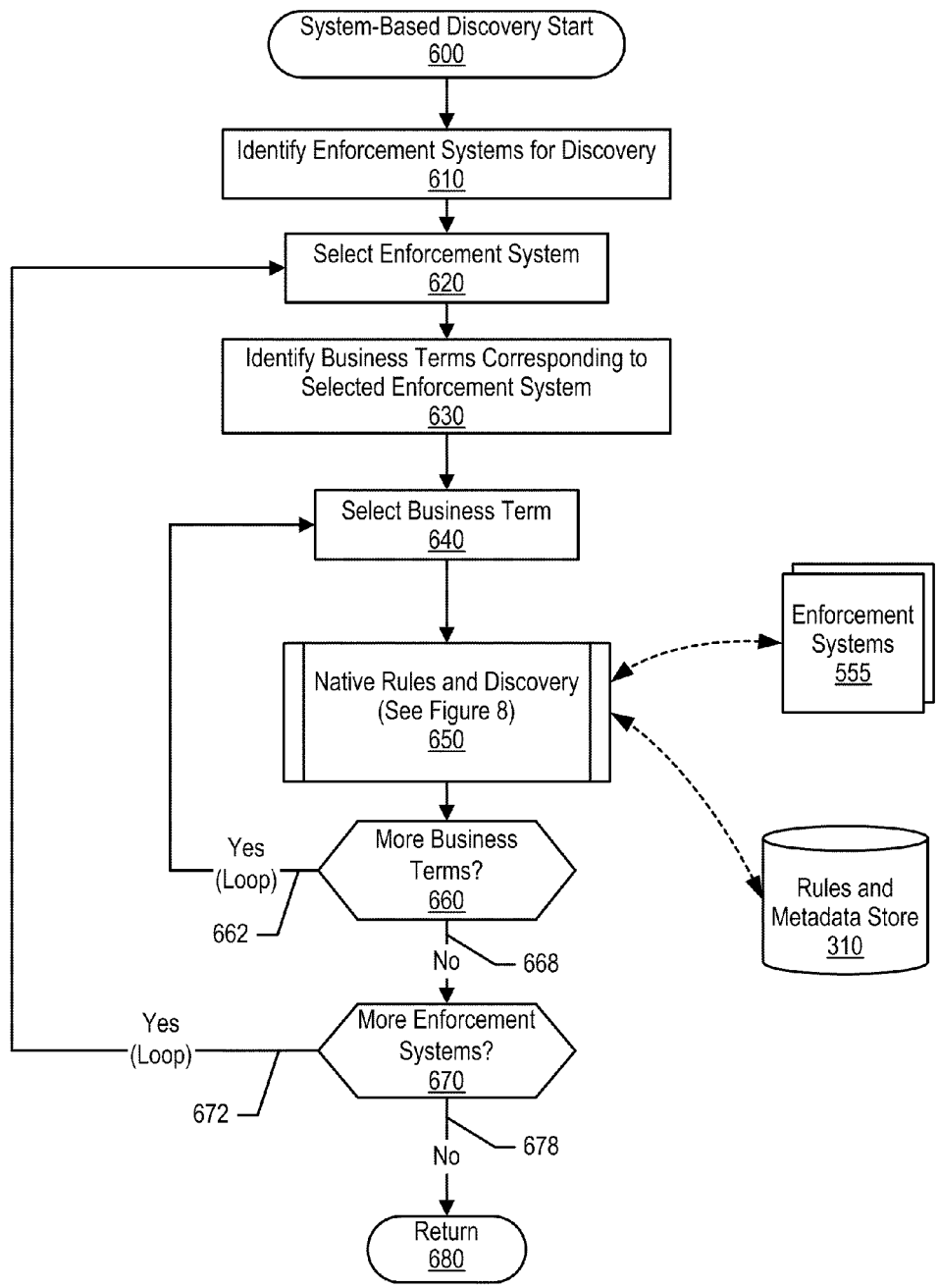
FIG. 6 is a flowchart showing steps taken in defining a system-based discovery scope and discovering native rules located at enforcement systems based upon the defined scope.

If the administrator wishes to perform a system-based discovery process, decision 540 branches to "System" branch 552 whereupon IIRF 300 discovers native rules using a system-based discovery process (pre-defined process block 550, see FIG. 6 and corresponding text for further details). On the other hand, if the administrator wishes to perform a business term-based discovery process, decision 540 branches to "Term" branch 558 whereupon IIRF 300 discovers native rules using a business term-based discovery process (pre-defined process block 560, see FIG. 7 and corresponding text for further details).

Once IIRF 300 has performed one of the discovery processes discussed above, IIRF 300 generates canonical rules from the discovered native rules and maps the canonical rules to the native rules. The generated canonical rules and mapping information are stored in rules and metadata store 310, which is accessible to users across an enterprise (pre-defined process block 570, see FIG. 9 and corresponding text for further details).

Figure 10:
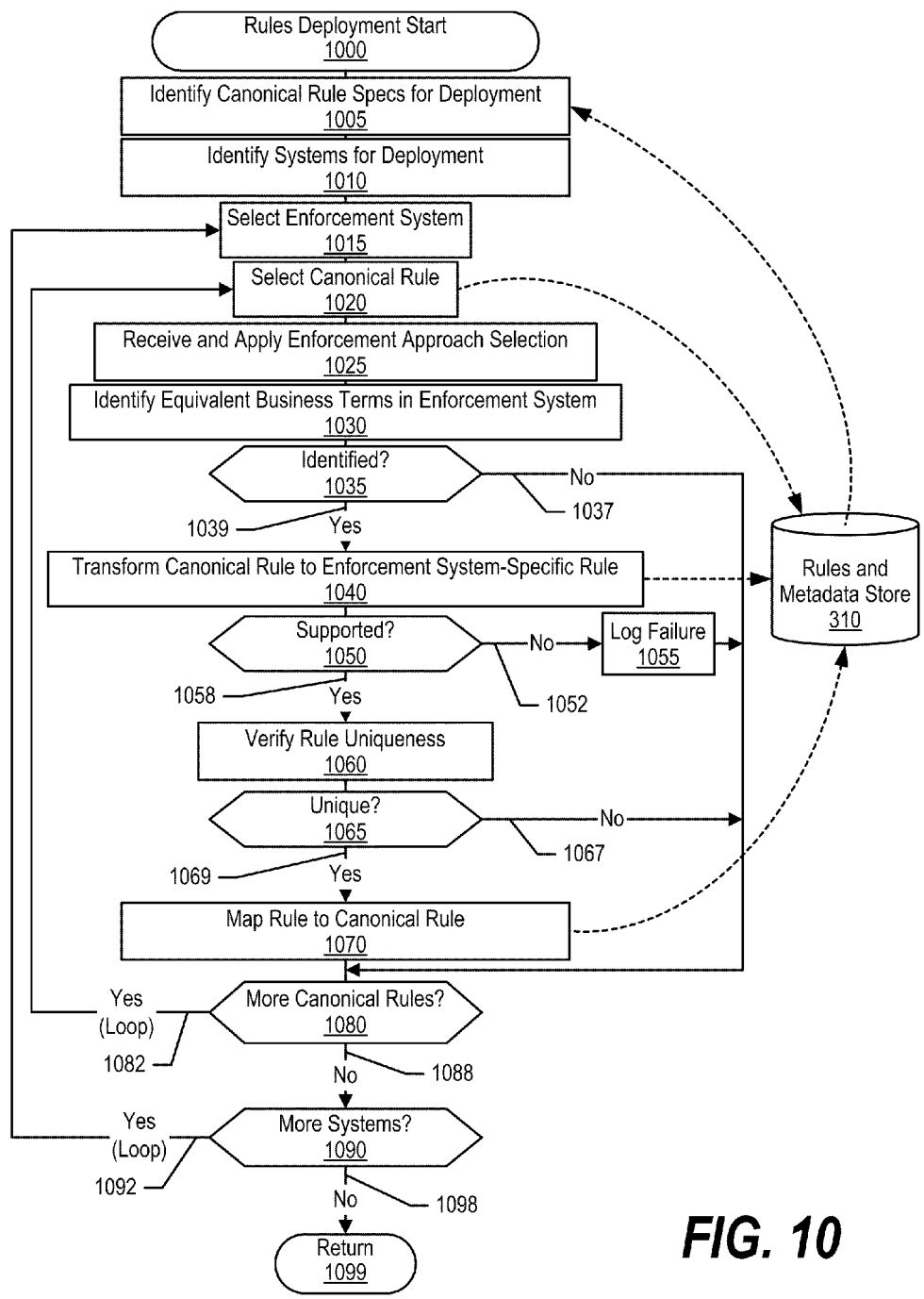
FIG. 10 is a flowchart showing steps taken in deploying canonical rules to enforcement systems.

IIRF 300 then generates enforcement system-specific rules from the canonical rules and deploys the enforcement system-specific rules to particular enforcement systems 555 (thus becoming native rules on an enforcement system) (pre-defined process block 580, see FIG. 10 and corresponding text for further details).

Once deployed, IIRF 300 monitors rules usage and checks for rule violations at enforcement systems 555 because rules may not remain static (pre-defined process block 590, see FIG. 11 and corresponding text for further details). For example, an organization's requirements on information integrity may change and, in turn, the rules require modification accordingly. This disclosure allows an administrator to modify the rules in one place (e.g., in the canonical model), and then propagate the changes accordingly. In one embodiment, this process of rule monitoring is ongoing, For example, after an initial rules mapping, IIRF 300 may have an ongoing validation, continually checking whether rules changed since the last validation. This ongoing validation may be triggered by a variety of factors, such as scheduling (e.g. validate all the rules during the weekly maintenance window) or some other events (e.g. a change to the application is detected).

A determination is made as to whether to continue analyzing rules usage (decision 592). If IIRF 300 should continue to monitor rules usage, decision 590 branches to "Yes" branch 592, whereupon IIRF 300 loops back to continue to analyze rules usage. This looping continues until the IIRF should stop monitoring rules usage, at which point decision 590 branches to "No" branch 592 whereupon IIRF 300 ends at 595.

FIG. 6 is a flowchart showing steps taken in defining a system-based discovery scope and discovering native rules located at enforcement systems based upon the defined scope. Processing commences at 600, whereupon IIRF 300 receives user input on which enforcement systems to discover at step 610. At step 620, IIRF 300 selects the first system and, at step 630, IIRF 300 identifies business terms to include in the scope. IIRF 300 leverages an association between the business term and a corresponding enforcement system that is typically available in business glossary products.

Figure 8:
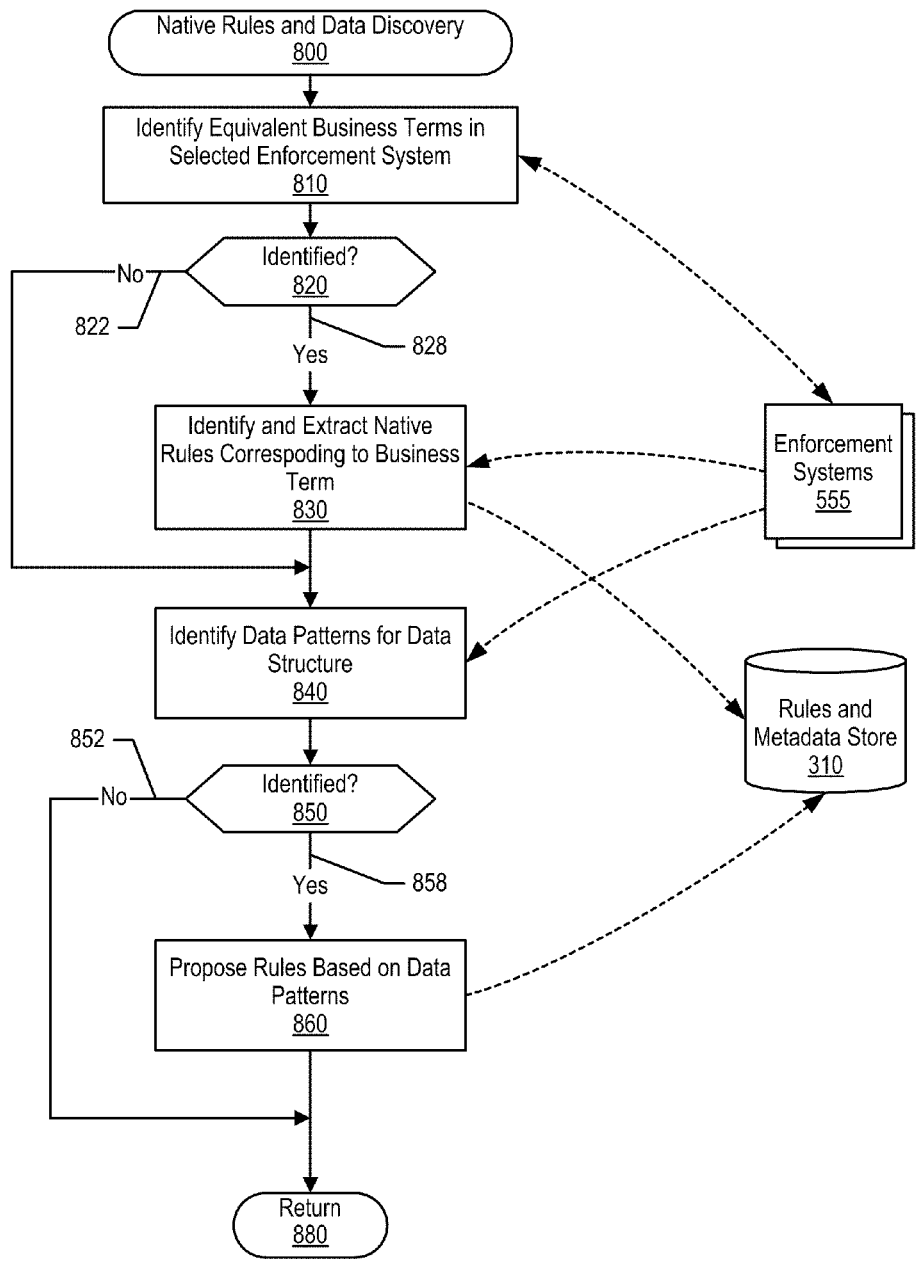
FIG. 8 is a flowchart showing steps taken in discovering native rules that are located on an enforcement system.

IIRF 300 selects the first business term at 640, and proceeds through a discovery process to identify native rules corresponding to the selected business term within the selected enforcement system included in enforcement systems 655 (pre-defined process block 650, see FIG. 8 and corresponding text for further details). The discovered native rules are stored in rules and metadata store 310.

A determination is made as to whether there are more business terms to use for discovering native rules (decision 660). If more business terms should be used, decision 660 branches to "Yes" branch 662, which loops back to select and discover native rules corresponding to the selected business term. This looping continues until IIRF 300 has performed a discovery process for each of the business terms, at which point decision 660 branches to "No" branch 668.

A determination is made as to whether there are more enforcement systems for which to discover native rules (decision 670). If there are more enforcement systems that require native rule discovery, decision 670 branches to "Yes" branch 672, whereupon processing loops back to select and discover native rules at the next enforcement system. This looping continues until each of enforcement systems 555 have been processed, at which point decision 670 branches to "No" branch 678, whereupon processing returns at 680.

Figure 7:
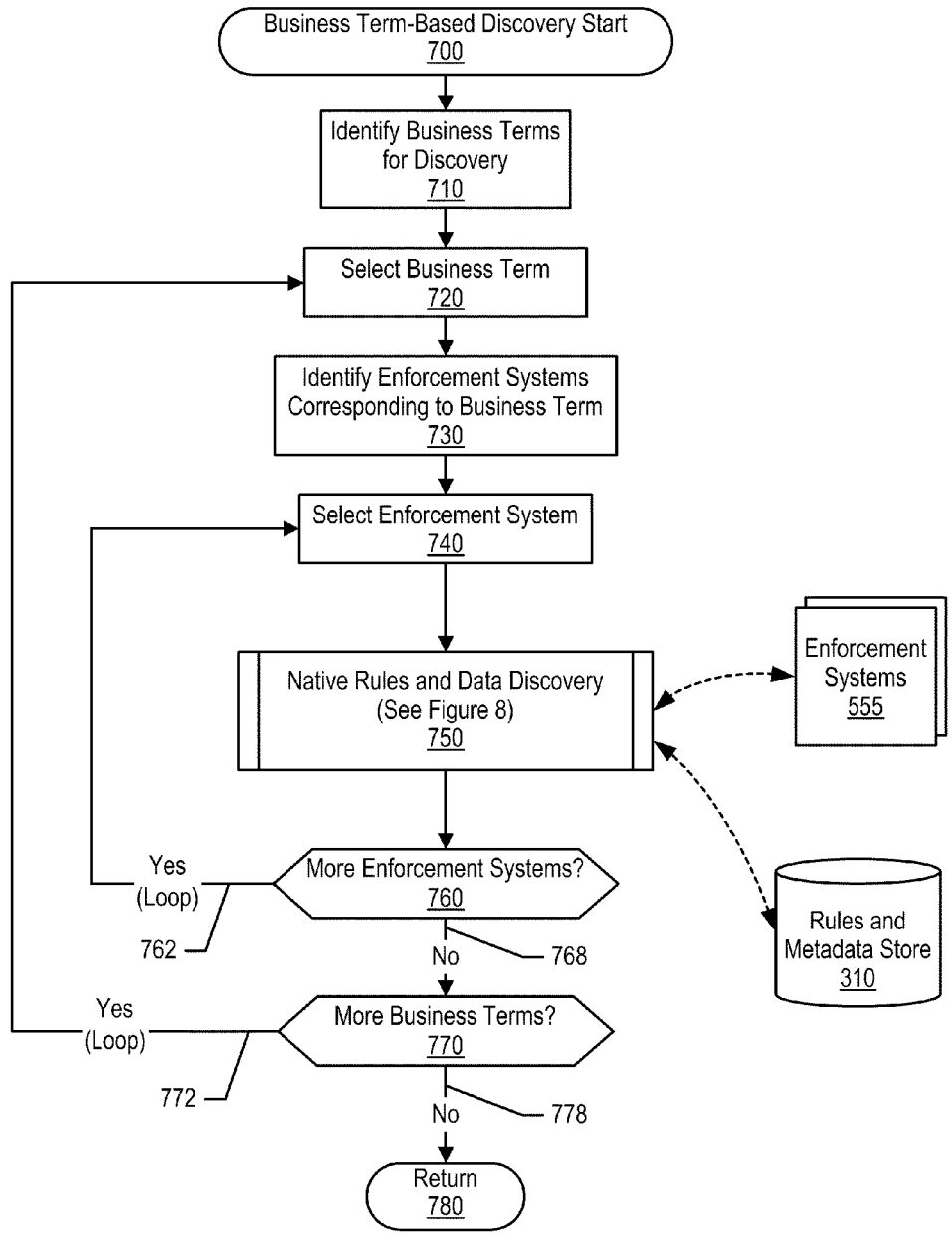
FIG. 7 is a flowchart showing steps taken in defining a business term-based discovery scope and discovering native rules located at enforcement systems based upon the defined scope.

FIG. 7 is a flowchart showing steps taken in defining a business term-based discovery scope and discovering native rules located at enforcement systems based upon the defined scope. Processing commences at 700, whereupon IIRF 300 receives input from a user as to which business terms to use for native rule discovery (step 710). At step 720, IIRF 300 selects the first business term and, at step 730, IIRF 300 identifies enforcement systems from enforcement systems 555 to include in the scope. IIRF 300 leverages an association between the business term and a corresponding enforcement system that is typically available in business glossary products.

IIRF 300 selects the first enforcement system at 740, and proceeds through a discovery process to identify native rules corresponding to the selected business term within the selected enforcement system (pre-defined process block 750, see FIG. 8 and corresponding text for further details). A determination is made as to whether there are more enforcement systems to use for discovering native rules using the selected business term (decision 760). If more enforcement systems require discovery, decision 760 branches to "Yes" branch 762, which loops back to select and process the system. This looping continues until each of the enforcement systems included in the discovery scope have been processed, at which point decision 760 branches to "No" branch 768.

A determination is made as to whether there are more business terms for which to discover native rules (decision 770). If there are more business terms, decision 770 branches to "Yes" branch 772, whereupon processing loops back to select and process the next business term. This looping continues until each of the business terms have been processed for each enforcement system, at which point decision 770 branches to "No" branch 778, whereupon processing returns at 780.

FIG. 8 is a flowchart showing steps taken in discovering native rules that are located on an enforcement system. Processing commences at 800, whereupon IIRF 300 identifies data structures equivalent to the selected business terms in one of a selected enforcement systems 555. A determination is made as to whether any equivalent constructs equivalent to the selected business terms were identified (decision 820). If the selected enforcement system does not include equivalent structures, decision 820 branches to "No" branch 822 bypassing native rule extraction steps.

On the other hand, if IIRF 300 identifies equivalent structures within the selected enforcement system, decision 820 branches to "Yes" branch 828, whereupon IIRF 300 retrieves native rules specifications from the selected enforcement system, and stores the native rules in rules and metadata store 310 (step 830). For example, if the business term "Customer" were selected, the equivalent construct in the rules enforcement system may be a "CUST" table. Thus, the rule "CUST.legal address !=NULL" may be identified and cataloged as a native rule.

Next, IIRF 300 identifies data patterns within the selected enforcement system for particular data structures in order to discover "hidden" rules, which are rules that are not explicitly specified but that can be inferred by analyzing data patterns (detecting that all values of an attribute "age" are greater than 18) (step 840).

If IIRF 300 does not identify data patterns, decision 850 branches to "No" branch 852 whereupon processing returns at 880. On the other hand, if IIRF 300 identifies data patterns, decision 850 branches to "Yes" branch 858, whereupon processing proposes native rules based on the data patterns and stores the proposed native rules in rules and metadata store 310. Processing returns at 880.

Figure 9:
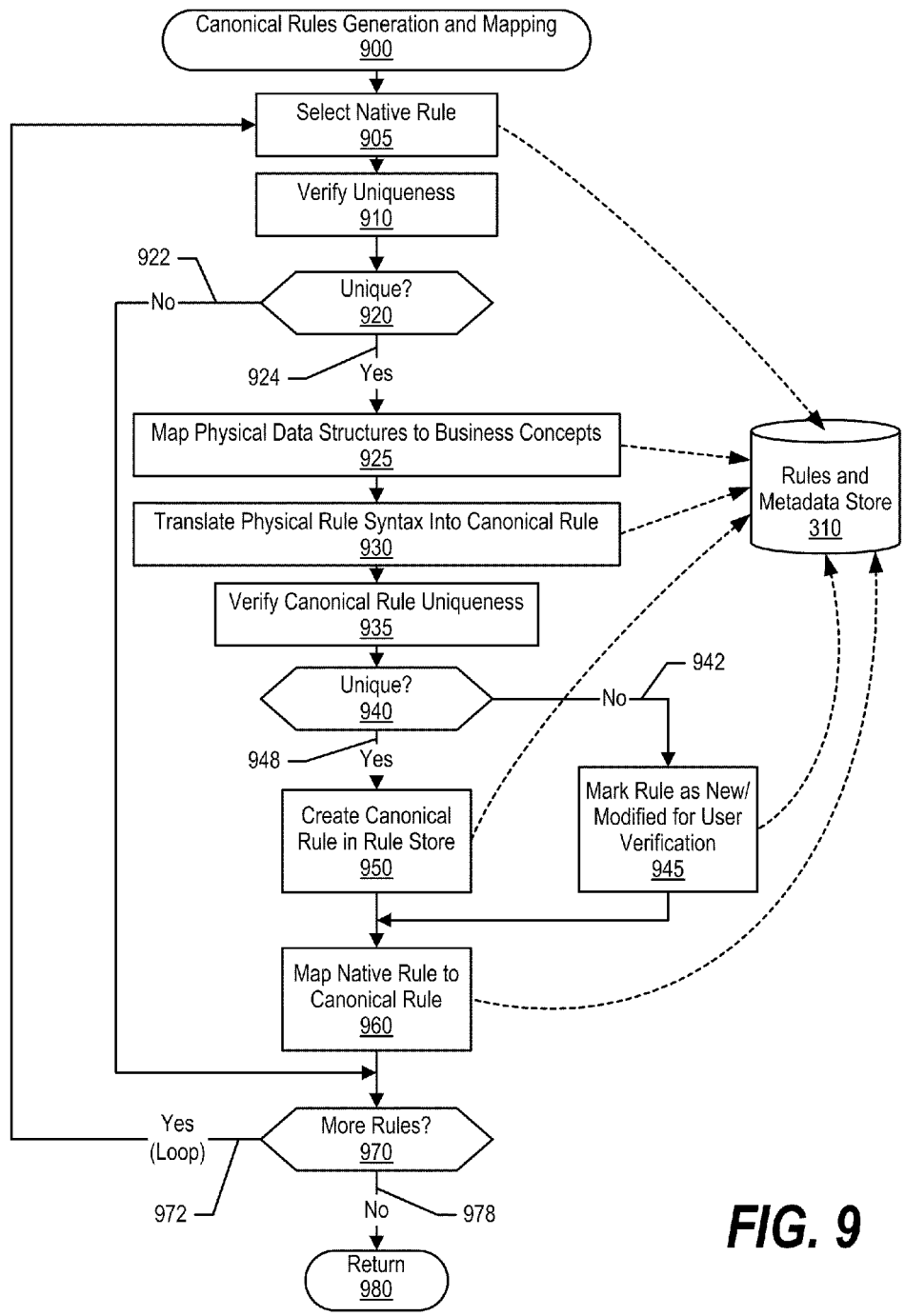
FIG. 9 is a flowchart showing steps taken in generating and mapping canonical rules to native rules.

FIG. 9 is a flowchart showing steps taken in generating and mapping canonical rules from native rules. In one embodiment, in order to map native rules to existing canonical rules, the native rules are translated into a format of the canonical rules. IIRF 300 also uses business terms that are associated to native rules and canonical rules to improve the matching process. Users may then verify the matching result before the native rule is associated to the corresponding canonical rule.

IIRF 300 commences at 900, whereupon IIRF 300 selects a native rule from rules and metadata store 310 at step 905. At step 910, IIRF 300 verifies the native rule's uniqueness, such as verifying whether there are other rules for enforcing a customer's age must be greater than 18. A determination is made as to whether the native rule is unique (decision 920). If the native rule is not unique, decision 920 branches to "No" branch 922, bypassing canonical rule generation and mapping steps. On the other hand, if the native rule is unique, decision 920 branches to "Yes" branch 924, whereupon IIRF 300 maps the native rule's physical data structures to business terms (step 925). Next, IIRF 300 translates the native rule into a canonical rule (step 930) and verifies the canonical rule's uniqueness at step 935. For example, a SQL command in one enforcement system or a Java program in another system representing a native rule may be translated into a common rules language (e.g., a canonical rules format).

A determination is made as to whether the canonical rule is unique relative to existing canonical rules, such as whether there are no other canonical rules that enforce a customer's age must be greater than 18 (decision 940). If the canonical rule is unique, decision 940 branches to "Yes" branch 948, whereupon IIRF 300 creates a canonical rule at step 950. On the other hand, if the canonical rule is not unique, decision 940 branches to "No" branch 942, whereupon IIRF 300 marks the canonical rule as new/modified for a user to verify whether to include the canonical rule as part of the canonical rule set (step 945).

At step 960, IIRF 300 creates a mapping entry and maps the native rule to the canonical rule, which is stored in rules and metadata store 310. By mapping the native rule to the canonical rule, IIRF 300 may track native rules and update the native rules accordingly by updating the respective canonical rule.

A determination is made as to whether there are more native rules to process (decision 970). If there are more native rules to process, decision 970 branches to "Yes" branch 972, which loops back to select and process the next native rule. This looping continues until each native rule is processed, at which point decision 970 branches to "No" branch 978 whereupon IIRF 300 returns at 980.

FIG. 10 is a flowchart showing steps taken in deploying canonical rules to enforcement systems. After canonical rules are specified, IIRF 300 may generate enforcement system-specific rules from the canonical rules, and deploy the enforcement system-specific rules to enforcement systems using different approaches (e.g., optimistic and/or pessimistic approaches). In one embodiment, IIRF 300 identifies rule gaps within an enforcement system's rule repository, and generates an enforcement system-specific rule from a canonical rule in order to fill the gap.

Processing commences at 1000, whereupon IIRF 300 identifies canonical rule specifications for deployment in rules and metadata store 310 at step 1005 (e.g. Customer.Age>18). At step 1010, IIRF 300 identifies enforcement systems to deploy rules, such as for a particular DB2 database.

IIRF 300 then selects one of the identified enforcement systems (step 1015) and one of the identified canonical rules (step 1020). Next, IIRF 300 receives an enforcement approach selection from a user at step 1025 (optimistic or pessimistic). This guides the user in consciously deciding on an optimum enforcement approach. If multiple approaches for a single system exist, the user may select the appropriate option.

Next, IIRF 300 identifies equivalent business terms in the identified enforcement system and relevant system specific data structures for which the rules should enforce at step 1030. For example, IIRF 300 may identify that a column "CUST.AGE" relates to the customer's age for which the rule "customer.age>18" is specified.

A determination is made as to whether the equivalent business terms were identified for the enforcement system (decision 1035). If the business terms were not identified, decision 1035 branches to "No" branch 1037 bypassing rule mapping steps. On the other hand, if the business terms were identified, decision 1035 branches to "Yes" branch 1039, whereupon IIRF 300 transforms the canonical rule to an enforcement system-specific rule (step 1040). IIRF 300 is aware of a required native format into which the canonical rule needs to be translated and performs the transformation accordingly.

A determination is made as to whether the enforcement system-specific rule is supported (decision 1050). For example, an underlying database may store the customer's date of birth, but does not support the logic to calculate the customer's age due to a lack of awareness of the current date. If the rule is not supported, decision 1050 branches to "No" branch 1052, whereupon IIRF 300 logs a failure at step 1055. On the other hand, if the rule is supported, decision 1050 branches to "Yes" branch 1058, whereupon IIRF 300 verifies the enforcement system-specific rule at step 1060.

When translating the rules from the canonical format into enforcement system-specific rules, IIRF 300 makes the user aware of any incompatibilities between the canonical and enforcement system-specific format that impact the translation of the specific rule set. IIRF 300 also requests additional information from the user, if necessary, that may be required by the selected enforcement system.

A determination is made as to whether the enforcement system-specific rule is unique (decision 1065). If the rule is not unique, decision 1065 branches to "No" branch 1067, bypassing rule mapping steps. On the other hand, if the rule is unique, decision 1065 branches to "Yes" branch 1069 whereupon IIRF 300 maps the enforcement system-specific rule to the canonical rule at step 1070 and stores the mapping in rules and metadata store 310.

A determination is made as to whether there are more canonical rules to map to the selected enforcement system (decision 1080). If there are more canonical rules to map, decision 1080 branches to "Yes" branch 1082, which loops back to select the next canonical rule. This looping continues until each canonical rule is processed, at which point decision 1080 branches to "No" branch 1088.

A determination is made as to whether there are more enforcement systems for which to deploy enforcement system-specific rules (decision 1090). If there are more enforcement systems to deploy rules, decision 1090 branches to "Yes" branch 1092, which loops back to select the next enforcement system. This looping continues until each enforcement system has been processed, at which point decision 1090 branches to "No" branch 1098, whereupon processing returns at 1099.

In one embodiment, after the canonical rules are translated into enforcement system-specific rules, IIRF 300 may provide additional deployment configuration information, such as when and how often to execute the validation rules.

In another embodiment, IIRF 300 maintains metadata about which rules have been translated and delegated to which enforcement systems. IIRF 300 may also gather operational metadata from the enforcement systems, such as how often the rules have been executed, whether errors have occurred, whether rule violations have occurred, etc. This metadata may be stored in rules and metadata store 310 for further rules usage analysis (see FIG. 11 and corresponding text for further details).

In yet another embodiment, IIRF 300 may aggregate the metadata from the various enforcement systems and relate the metadata back to corresponding canonical rules. In turn, IIRF 300 may provide a user with a broad understanding of where rules are enforced, how they are enforced, and current states of data.

FIG. 11 is a flowchart showing steps taken in analyzing rules usage across enforcement systems. Information integrity rules typically do not remain static in an organization because requirements on information integrity change and, in turn, the rules should be modified accordingly. IIRF 300 allows rule modification in one place (e.g., modify a canonical model), which is propagated to corresponding enforcement system-specific rules and native rules that.

In addition, IIRF 300 provides an audit mechanism that may be configured to maintain a wide range of audit information, such as when and by whom audit rules are created, modified (how), deleted (why); which canonical rules have been translated (e.g., rule mapping); how native rules are enforced in which systems; operational rule enforcement metadata (e.g., frequency of rule execution, violations, etc.); and rule violations notifications. IIRF 300 may also provide standard reports to a user in order for the user to visualize audit information, define additional reports, and/or customize standard reports.

Processing commences at 1100, whereupon IIRF 300 selects a first enforcement system at step 1105. At step 1110, IIRF 300 selects a first canonical rule. Next, IIRF 300 maps the selected canonical rule to a native rule (or enforcement system-specific rule) of the selected enforcement system (step 1115). IIRF 300 retrieves usage information from the selected enforcement system at step 1120. A determination is made as to whether the retrieved information requires translating (decision 1130). For example, an enforcement system may use a local time zone to track execution status or uses a proprietary format for error messages, which is then translated into a common format and language.

If the retrieved information requires translating, decision 1130 branches to "Yes" branch 1132, whereupon IIRF 300 translates the usage information into a common format (step 1135). On the other hand, if the retrieved information does not require translating, decision 1130 branches to "No" branch 1138.

IIRF 300 analyzes the usage information at step 1140, and a determination is made as to whether to adjust the canonical rule mapping based upon the analysis in step 1140 (decision 1150). For example, the analysis may detect that a rule within an enforcement system (e.g., "customer.age >18") has not been mapped to a corresponding canonical rule. If IIRF 300 should adjust the canonical rule mapping, decision 1150 branches to "Yes" branch 1152, whereupon IIRF 300 adjusts the canonical rule mapping at step 1155. On the other hand, if the canonical rule does not require adjusting, decision 1150 branches to "No" branch 1158, bypassing rule adjustment steps.

A determination is made as to whether there are more canonical rules to process (decision 1160). If there are more canonical rules to process, decision 1160 branches to "Yes" branch 1162 whereupon IIRF 300 selects (step 1165) and processes the next canonical rule. This looping continues until each canonical rule has been processed, at which point decision 1160 branches to "No" branch 1168.

A determination is made as to whether there are more enforcement systems to select (decision 1170). If there are more enforcement systems to select, decision 1170 branches to "Yes" branch 1172, which loops back to select (step 1175) and process canonical rules for the next enforcement system. This looping continues until there are no more enforcement systems to select, at which point decision 1170 branches to "No" branch 1178, whereupon processing returns at 1180.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

What is claimed is:

1. A computer program product stored in a computer readable storage device, comprising functional descriptive material that, when executed by an information handling system, causes the information handling system to perform actions for managing a plurality of rules, wherein the plurality of rules include one or more native rules and one or more canonical rules, the actions including:
   selecting one or more business terms, wherein each of the one or more selected business terms corresponds to one or more standardized business definitions;
   identifying one or more data structures utilized by a first enforcement system that are equivalent to the one or more selected business terms;
   identifying one of the one or more native rules utilized by the first enforcement system that includes at least one of the one or more equivalent data structures, the identified native rule written in a first enforcement system-specific format; and
   creating a mapping entry that maps the identified native rule to a selected one of the canonical rules, wherein the selected canonical rule includes one or more of the one more selected business terms, and wherein the selected canonical rule is written in a canonical format that is independent from the first enforcement system-specific format.

2. The computer program product of claim 1 wherein the information handling system further performs actions that include:

detecting that a rule repository corresponding to a second enforcement system has a rule gap corresponding to the selected canonical rule;

generating an enforcement system-specific rule from the selected canonical rule in a second enforcement system-specific format that is different than the first enforcement system-specific format;

deploying the enforcement system-specific rule to a second enforcement system, wherein the first enforcement system enforces the discovered native rule on data stored in a database and the second enforcement system enforces the enforcement system-specific rule on the data stored in the database, the data and the database being common to both the first enforcement system and the second enforcement system; and wherein the first enforcement system is a first system type and the second enforcement system is a second system type that is different than the first system type, and wherein the first system type is selected from the group consisting of an optimistic enforcement system type and a pessimistic enforcement system type.

3. The computer program product of claim 1 wherein the information handling system further performs actions that include:

verifying that the identified native rule is unique compared to the one or more canonical rules; and in response to verifying the identified native rule is unique, creating the selected one of the canonical rules by translating the identified native rule into the selected one of the canonical rules.

4. The computer program product of claim 1 wherein the information handling system further performs actions that include:

analyzing a data pattern at the first enforcement system;

generating a proposed rule based upon the analyzing, wherein the proposed rule is not included in a rule repository corresponding to the first enforcement system; and including the proposed rule in the plurality of rules.

5. The computer program product of claim 1 wherein the information handling system further performs actions that include:

retrieving usage information corresponding to a second native rule included in the plurality of rules;

analyzing the usage information;

in response to analyzing the usage information, determining to map the second native rule to the selected one of the canonical rules; and adjusting the created mapping entry by mapping the subsequent native rule to the selected one of the canonical rules.

6. An information handling system comprising:

one or more processors;

a memory accessible by at least one of the processors;

a nonvolatile storage area accessible by at least one of the processors;

a set of instructions stored in the memory and executed by at least one of the processors in order to perform actions for managing a plurality of rules, wherein the plurality of rules include one or more native rules and one or more canonical rules, the actions including:

selecting one or more business terms, wherein each of the one or more selected business terms corresponds to one or more standardized business definitions;

identifying one or more data structures utilized by a first enforcement system that are equivalent to the one or more selected business terms;

identifying one of the one or more native rules utilized by the first enforcement system that includes at least one of the one or more equivalent data structures, the identified native rule written in a first enforcement system-specific format; and creating a mapping entry that maps the identified native rule to a selected one of the canonical rules, wherein the selected canonical rule includes one or more of the one more selected business terms, and wherein the selected canonical rule is written in a canonical format that is independent from the first enforcement system-specific format.

7. The information handling system of claim 6 wherein the set of instructions further performs actions that include:

detecting that a rule repository corresponding to a second enforcement system has a rule gap corresponding to the selected canonical rule;

generating an enforcement system-specific rule from the selected canonical rule in a second enforcement system-specific format that is different than the first enforcement system-specific format;

deploying the enforcement system-specific rule to a second enforcement system, wherein the first enforcement system enforces the discovered native rule on data stored in a database and the second enforcement system enforces the enforcement system-specific rule on the data stored in the database, the data and the database being common to both the first enforcement system and the second enforcement system; and wherein the first enforcement system is a first system type and the second enforcement system is a second system type that is different than the first system type, and wherein the first system type is selected from the group consisting of an optimistic enforcement system type and a pessimistic enforcement system type.

8. The information handling system of claim 6 wherein the information set of instructions further performs actions that include:

verifying that the identified native rule is unique compared to the one or more canonical rules; and in response to verifying the identified native rule is unique, creating the selected one of the canonical rules by translating the identified native rule into the selected one of the canonical rules.

9. The information handling system of claim 6 wherein the set of instructions further performs actions that include:

analyzing a data pattern at the first enforcement system;

generating a proposed rule based upon the analyzing, wherein the proposed rule is not included in a rule repository corresponding to the first enforcement system; and including the proposed rule in the plurality of rules.

10. The information handling system of claim 6 wherein the set of instructions further performs actions that include:

retrieving usage information corresponding to a second native rule included in the plurality of rules;

analyzing the usage information;

in response to analyzing the usage information, determining to map the second native rule to the selected one of the canonical rules; and adjusting the created mapping entry by mapping the second native rule to the selected one of the canonical rules.

11. A computer-implemented method comprising:

selecting one or more business terms, wherein each of the one or more selected business terms corresponds to one or more standardized business definitions;

identifying one or more data structures utilized by a first enforcement system that are equivalent to the one or more selected business terms;

identifying one of the one or more native rules utilized by the first enforcement system that includes at least one of the one or more equivalent data structures, the identified native rule written in a first enforcement system-specific format; and creating a mapping entry that maps the identified native rule to a selected one of the canonical rules, wherein the selected canonical rule includes one or more of the one more selected business terms, and wherein the selected canonical rule is written in a canonical format that is independent from the first enforcement system-specific format.

12. The method of claim 11 further comprising:

detecting that a rule repository corresponding to a second enforcement system has a rule gap corresponding to the selected canonical rule;

generating an enforcement system-specific rule from the selected canonical rule in a second enforcement system-specific format that is different than the first enforcement system-specific format;

deploying the enforcement system-specific rule to a second enforcement system, wherein the first enforcement system enforces the discovered native rule on data stored in a database and the second enforcement system enforces the enforcement system-specific rule on the data stored in the database, the data and the database being common to both the first enforcement system and the second enforcement system; and wherein the first enforcement system is a first system type and the second enforcement system is a second system type that is different than the first system type, and wherein the first system type is selected from the group consisting of an optimistic enforcement system type and a pessimistic enforcement system type.

13. The method of claim 11 further comprising:

verifying that the identified native rule is unique compared to the one or more canonical rules; and in response to verifying the identified native rule is unique, creating the selected one of the canonical rules by translating the identified native rule into the selected one of the canonical rules.

14. The method of claim 11 further comprising:

analyzing a data pattern at the first enforcement system;

generating a proposed rule based upon the analyzing, wherein the proposed rule is not included in a rule repository corresponding to the first enforcement system; and including the proposed rule in the plurality of rules.

15. The method of claim 11 further comprising:

retrieving usage information corresponding to a second native rule included in the plurality of rules;

analyzing the usage information;

in response to analyzing the usage information, determining to map the second native rule to the selected one of the canonical rules; and adjusting the created mapping entry by mapping the subsequent native rule to the selected one of the canonical rules.

* * * * *